(12) United States Patent
Suzuki et al.

(10) Patent No.: US 7,387,589 B2
(45) Date of Patent: Jun. 17, 2008

(54) SHIFT CONTROL APPARATUS OF BELT TYPE CONTINUOUSLY VARIABLE TRANSMISSION

(75) Inventors: Tsuyoshi Suzuki, Kanagawa (JP); Masaaki Uchida, Kanagawa (JP)

(73) Assignee: Jatco Ltd, Shizuoka (JP)

( * ) Notice: Subject to any disclaimer, the term of this patent is extended or adjusted under 35 U.S.C. 154(b) by 259 days.

(21) Appl. No.: 11/391,240

(22) Filed: Mar. 29, 2006

(65) Prior Publication Data
US 2006/0229156 A1    Oct. 12, 2006

(30) Foreign Application Priority Data
Apr. 11, 2005    (JP) ............... 2005-113808

(51) Int. Cl.
*F16H 61/662* (2006.01)
(52) U.S. Cl. .................. 477/46; 477/37; 477/45; 477/50; 701/51; 474/12; 474/18; 474/28
(58) Field of Classification Search .................. None
See application file for complete search history.

(56) References Cited

U.S. PATENT DOCUMENTS 5,089,964 A * 2/1992 Morishige et al. ............ 701/51
7,065,441 B2 * 6/2006 Yamamoto et al. ........... 701/51
7,140,991 B2 * 11/2006 Sawada et al. ............... 474/28
2006/0172829 A1 * 8/2006 Ishio ........................... 474/18

FOREIGN PATENT DOCUMENTS

JP    2813671 B2    8/1998

* cited by examiner

*Primary Examiner*—David D. Le
(74) *Attorney, Agent, or Firm*—Foley & Lardner LLP

(57) ABSTRACT

A shift control apparatus of a belt type continuously variable transmission is comprised of a controller which is arranged to set a first hydraulic pressure controlled variable based on a first target transmission ratio determined based on a vehicle traveling condition, to set a second hydraulic controlled variable based on a second target transmission ratio determined based on a predetermined transfer characteristic, to steplessly control the transmission ratio by controlling hydraulic pressures of primary and secondary pulleys hydraulic based on the first and second hydraulic pressure controlled variables, to detect at least one of the hydraulic pressures of the primary and secondary pulleys, and to correct the second target transmission ratio based on the detected hydraulic pressure.

8 Claims, 7 Drawing Sheets

STROKE RATE MAP

SHIFT TIME CONSTANT MAP

THRUST DIFFERENCE MAP

PREDICTED STROKE SPEED MAP

STROKE POSITION MAP

SHIFT CONTROL APPARATUS OF BELT TYPE CONTINUOUSLY VARIABLE TRANSMISSION

BACKGROUND OF THE INVENTION

The present invention relates to a shift control apparatus of a belt type continuously variable transmission (CVT) which is capable of steplessly changing a transmission ratio in a manner that contact radii of primary and secondary pulleys relative to an endless belt are varied by hydraulically controlling groove widths of the pulleys.

Japanese Patent No. 2813671 discloses a belt type CVT control apparatus for controlling a primary pulley hydraulic pressure and a secondary pulley hydraulic pressure of the belt type CVT. This control apparatus comprises a hydraulic pressure ratio control system and a flow rate control system, and is arranged to determine a target primary pulley hydraulic pressure from pressure values necessary for the hydraulic pressure ratio control system and a flow rate control system and to execute a shift control according to the target primary pulley pressure so as to achieve a stable shift control.

SUMMARY OF THE INVENTION

However, holding and changing of the transmission ratio of the CVT are actually achieved by controlling the primary pulley hydraulic pressure and the secondary pulley hydraulic pressure. Even if the target hydraulic pressures are determined from the hydraulic pressure ratio control system and the flow rate control system, there is no assurance of ensuring an actual hydraulic responsibility. For example, in case that there is a large difference between an actual hydraulic pressure and a target hydraulic pressure, PID control cannot prevent an overshoot of a hydraulic pressure, and therefore it is difficult to achieve the stable shift control under such a case. Control gains of a PID controller are basically determined taking account of a specifications of the CVT and a vehicle equipped with the CVT. It is not assure that the control gains are set at optimum values since there are actually existed aging and dispersion of products.

It is therefore an object of the present invention to provide a shift control apparatus of a belt type CVT which is capable of achieving a stable shift control without generating an overshoot even if there is existed a dispersion in hydraulic pressure responsibilities among vehicles.

An aspect of the present invention resides in a shift control apparatus of a belt type continuously variable transmission, which comprises a first controlling section setting a first hydraulic pressure controlled variable on the basis of a first target transmission ratio determined based on a vehicle traveling condition; a second controlling section setting a second hydraulic pressure controlled variable on the basis of a second target transmission ratio determined based on a predetermined transfer characteristic; a transmission ratio controlling section steplessly controlling a transmission ratio by controlling a primary pulley hydraulic pressure and a secondary pulley hydraulic pressure on the basis of the first hydraulic pressure controlled variable and the second hydraulic pressure controlled variable; a hydraulic pressure detecting section detecting at least one of a primary pulley hydraulic pressure and a secondary pulley hydraulic pressure; and a first correcting section correcting the second target transmission ratio on the basis of the hydraulic pressure detected by the hydraulic pressure detecting section.

Another aspect of the present invention resides in a method of executing a shift control of a belt type continuously variable transmission. The method comprises a step of setting a first hydraulic pressure controlled variable on the basis of a first target transmission ratio, which is determined based on a vehicle traveling condition; a step of setting a second hydraulic pressure controlled variable on the basis of a second target transmission ratio, which is determined based on a predetermined transfer characteristic; a step of steplessly controlling the transmission ratio by controlling a primary pulley hydraulic pressure and a secondary pulley hydraulic pressure on the basis of the first hydraulic pressure controlled variable and the second hydraulic pressure controlled variable; a step of detecting at least one of a primary pulley hydraulic pressure and a secondary pulley hydraulic pressure; and a step of correcting the second target transmission ratio on the basis of the hydraulic pressure detected by the hydraulic pressure detecting section.

A further aspect of the present invention resides in a shift control apparatus of a belt type continuously variable transmission which is mounted on a vehicle and has hydraulically controlled primary and secondary pulleys. The shift control apparatus comprises a controller which is arranged to calculate a first target transmission ratio on the basis of a vehicle traveling condition, to calculate a first hydraulic pressure controlled variable on the basis of the first target transmission ratio, to calculate a second target transmission ratio on the basis of the first target transmission ratio and a predetermined transfer characteristic, to calculate a second hydraulic pressure controlled variable on the basis of the second target transmission ratio, to obtain at least one of actual hydraulic pressures of the primary and secondary pulleys, to correct the second target transmission ratio on the basis of the obtained hydraulic pressure, to calculate a command value for controlling hydraulic pressures of the primary and secondary pulleys on the basis of the first and second hydraulic pressure controlled variables, and to output the command value to an actuator for hydraulically controlling the primary and secondary pulleys.

The other objects and features of this invention will become understood from the following description with reference to the accompanying drawings.

DETAILED DESCRIPTION OF THE INVENTION

Referring to FIGS. 1 through 12, there is discussed a shift control apparatus of a stepless automatic transmission according to an embodiment of the present invention.

Figure 1:
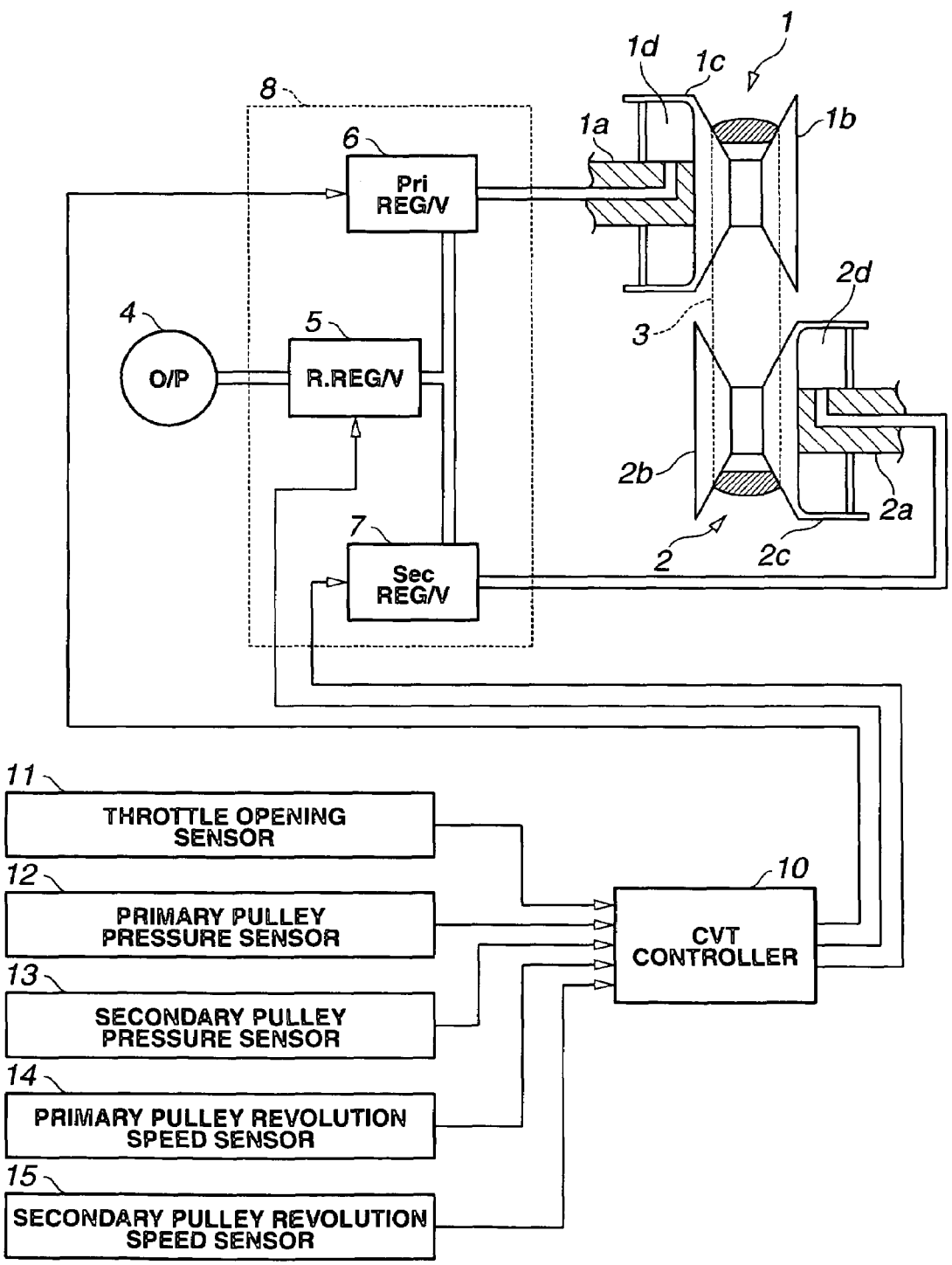
FIG. 1 is a schematic view showing a belt type continuously variable transmission (CVT) according to an embodiment of the present invention.

FIG. 1 shows a control system of a belt type continuously variable transmission (CVT) mounted on a vehicle in accordance with the embodiment of the present invention. The CVT comprises a primary pulley 1, a secondary pulley 2, an endless belt 3 for transmitting a rotational force of primary pulley 1 to second pulley 2. Primary pulley 1 comprises a fixed cone plate 1b, which integrally rotates with an input shaft 1a, and a movable cone plate 1c, which is disposed opposite to fixed cone plate 1b and forms a V-shaped pulley groove together with movable cone plate 1c. A primary pulley cylinder chamber 1d is formed at a back surface of movable cone plate 1c, which surface is opposite to a front surface forming the pulley groove of movable cone plate 1c. Movable cone plate 1c is movable along an axial direction of drive shaft 1a according to a hydraulic pressure applied to primary pulley cylinder chamber 1d so as to vary a width of the pulley groove of primary pulley 1.

Secondary pulley 2 is formed on an output shaft 2a. Secondary pulley 2 comprises a fixed cone plate 2b, which integrally rotates with output shaft 2a, and a movable cone plate 2c, which is disposed opposite to fixed cone plate 2b and forms a V-shaped pulley groove together with fixed cone plate 2c. A secondary pulley cylinder chamber 2d is formed at a back surface of movable cone plate 2c, which surface is opposite to a front surface forming the pulley groove of movable cone plate 2c. Movable cone plate 2c is movable along an axial direction of follower shaft 2a according to a hydraulic pressure applied to secondary pulley cylinder chamber 2d so as to vary a width of the pulley groove of secondary pulley 2.

Output shaft 2a is connected with a not-shown drive gear. The drive gear drives a not-shown drive shaft which transmits a power to wheels through a pinion, a final gear and a differential.

By varying contact radii of primary and secondary pulleys 1 and 2 with respect to belt 3 in a manner of moving movable cone plate 1c of primary pulley 1 and movable cone plate 2c of secondary pulley 1 along the respective axial directions, a rotational ratio, that is, a transmission ratio ip between primary pulley 1 and secondary pulley 2 is varied. A CVT controller 10 executes a control of varying widths of the respective V-shaped pulley grooves (stroke positions xs) by controlling hydraulic pressures to be applied to primary cylinder chamber 1d and/or secondary cylinder chamber 2d.

CVT controller 10 receives signals indicative of a throttle opening TVO outputted from a throttle opening sensor 11, a primary pulley pressure outputted from a primary pulley pressure sensor 12, a secondary pulley pressure outputted from a secondary pulley pressure sensor 13, a primary pulley revolution speed outputted from a primary pulley revolution speed sensor 14 and a secondary pulley revolution speed outputted from a secondary pulley revolution speed sensor 15. CVT controller 10 calculates a control signal on the basis of these received signals and outputs the control signal to a hydraulic pressure control valve unit 8.

Hydraulic pressure control valve unit 8 comprises a pressure regulator valve 5, a primary regulator valve 6 and a secondary regulator valve 7. Pressure regulator valve 5 obtains a line pressure by controlling a discharge pressure of an oil pump 4. Primary regulator valve 6 obtains a primary hydraulic pressure by controlling the line pressure on the basis of the control signal. Secondary regulator valve 7 obtains a secondary pulley hydraulic pressure by controlling the line pressure on the basis of the control signal.

Figure 2:
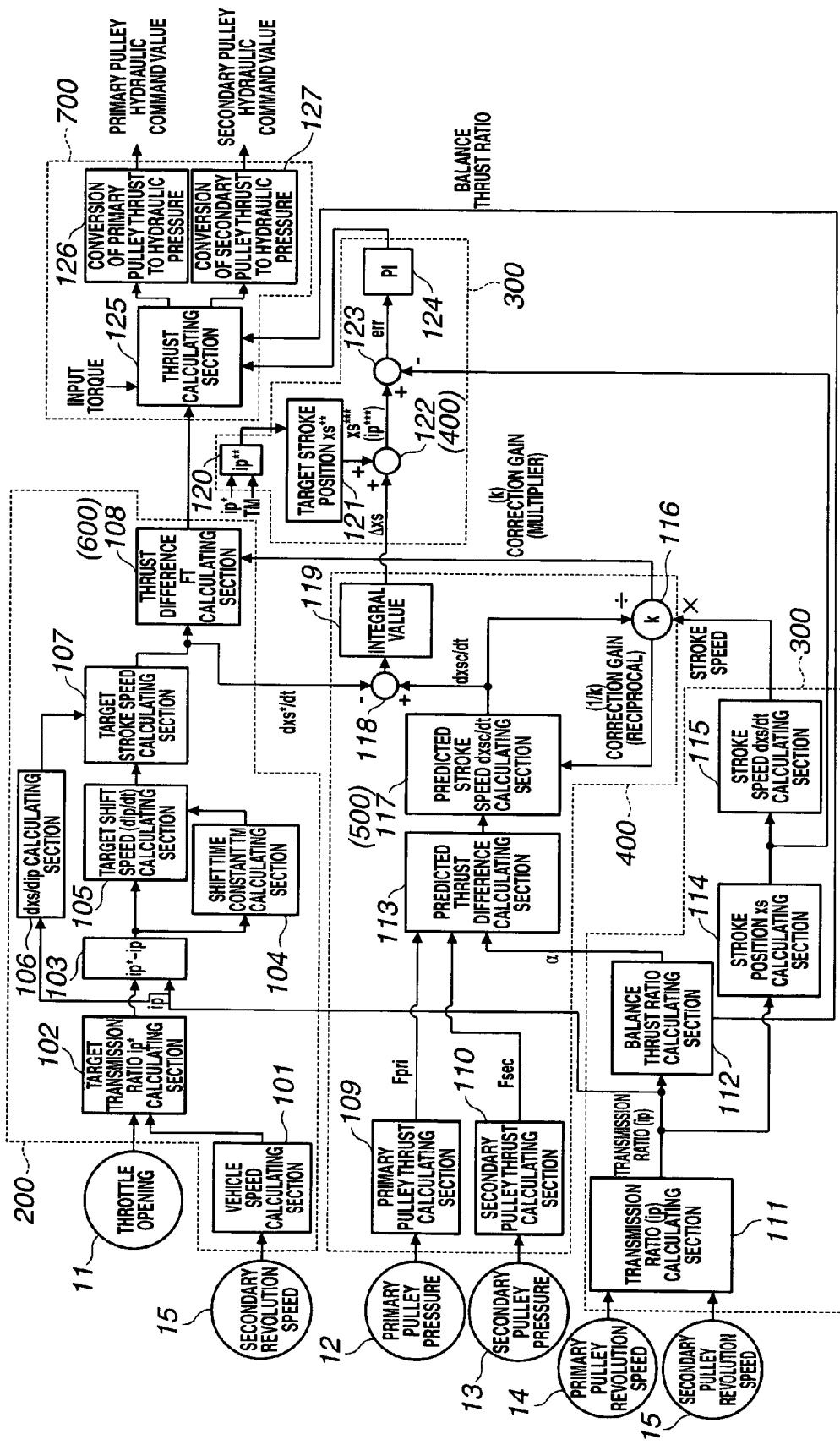
FIG. 2 is a block diagram showing a shift control apparatus of the CVT according to the embodiment of the present invention.
Figure 3:
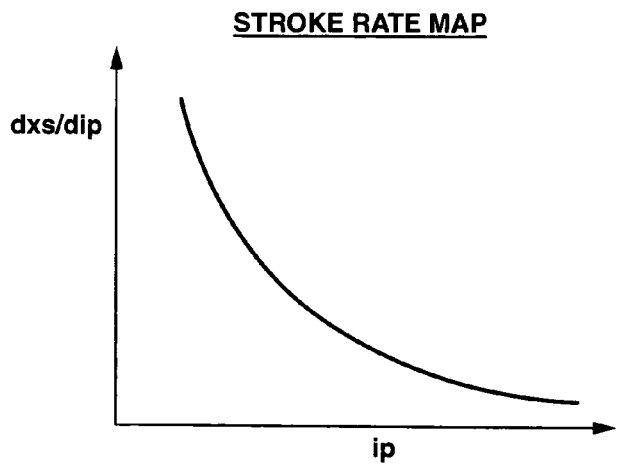
FIG. 3 is a graph showing a stroke ratio map employed in the embodiment of the present invention.
Figure 4:
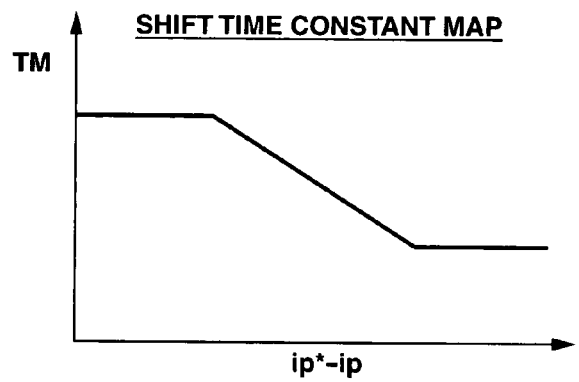
FIG. 4 is a graph showing a shift time constant map employed in the embodiment of the present invention.

FIG. 2 shows a block diagram showing a control structure of CVT controller 10. The shift control apparatus of the belt type CVT according to the embodiment of the present invention comprises a first controlling section 200, a second controlling section 300, a first correcting section 400, a second correcting section 500, a third correcting section 600, and a command value calculating section 700.

First controlling section 200 comprises a first target transmission ratio calculating section 102, a transmission ratio difference calculating section 103, a shift time constant calculating section 104, a target shift speed calculating section 105, a stroke rate calculating section 106, a target stroke speed calculating section 107, and a thrust difference calculating section 108. Thrust difference calculating section 106 includes the third correction section 600 for correcting a thrust difference map on the basis of a correction gain k.

Second controlling section 300 comprises a transmission ratio calculating section 111, a balance thrust difference calculating section 112, a stroke position calculating section 114, a second target transmission ratio calculating section 120, a target stroke position calculating section 121, an adding section 122, a stroke position difference calculating section 123 and a PI controlling section 124. Adding section 122 includes first correcting section 400 for correcting a second target transmission ratio ip*** on the basis of the output of an integral section 119.

First correcting section 400 comprises a primary pulley thrust calculating section 109, a secondary pulley thrust calculating section 110, a predicted thrust calculating section 113, and the integral section 119. Predicted stroke speed calculating section 117 includes second correcting section 400 for correcting a predicted stroke speed on the basis of an actual stroke speed.

In first controlling section 200, vehicle speed calculating section 101 calculates a vehicle speed on the basis of the secondary revolution speed inputted from secondary pulley revolution speed sensor 15. First target transmission ratio calculating section 102 calculates a first target transmission ratio ip* on basis of the throttle opening inputted from throttle opening sensor 11 and the calculated vehicle speed. Transmission ratio difference calculating section 103 calculates a first transmission ratio difference Δip which is a difference between first target transmission ratio ip* and an actual transmission ratio ip. Shift time constant calculating section 104 calculates a shift time constant TM from a shift time-constant map shown in FIG. 4.

Target shift speed calculating section 105 claculates a target shift speed dip*/dt on the basis of first transmission ratio difference Δip and shift time constant TM from the following expression (1).

$$dip*/dt = \Delta ip/(1+TM \times s) \quad (1)$$

where s is a Laplace operator.

Transmission time constant calculating section 104 and target shift speed calculating section 105 may be properly constructed using other calculations. Stroke rate calculating section 106 calculates a rate dxs/dip of change of a stroke position of movable cone plate 1c along the axial direction with respect to change of the transmission ratio at the actual transmission ratio ip using a stroke rate map shown in FIG. 3. Although the embodiment according to the present invention has been shown and described so as to employ a change of rate of the stroke position of movable cone plate 1c, the invention is not limited to this, and the rate of change of the stroke position of movable cone plate 2c, or both rates of changes of the stroke position of movable cone plates 1c and 2c may be employed.

Target stroke speed calculating section 107 calculates a target stroke speed dxs*/dt on the basis of stroke rate dxs/dip and target shift speed dip*/dt from the following expression (2).

$$dxs*/dt=(dxs/\text{dip})\times(dip*/dt) \quad (2)$$

Figure 5:
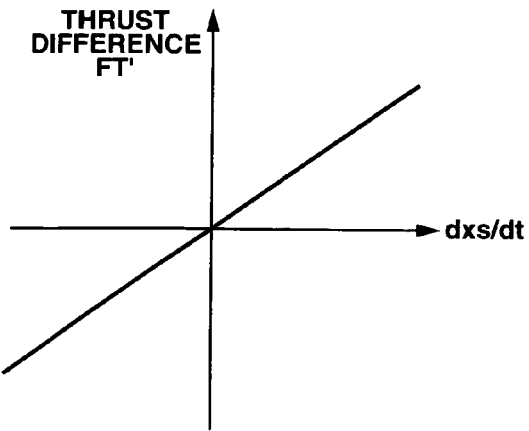
FIG. 5 is a graph showing a trust difference employed in the embodiment of present invention.

Trust difference calculating section 108 calculates a provisional thrust difference FT' on the basis of target stroke speed dxs*/dt using a thrust difference map shown in FIG. 5. Further, thrust difference calculating section 108 functions as a part of third correcting section 600 of correcting provisional thrust difference FT' by multiplying provisional thrust difference FT' by correction gain k and obtains a final thrust difference FT.

In first correcting section 400, primary pulley thrust calculating section 109 calculates a primary pulley thrust Fpri on the basis of the primary pulley pressure (actual hydraulic pressure) inputted from primary pulley pressure sensor 12. Secondary pulley thrust calculating section 110 calculates a secondary pulley thrust Fsec on the basis of a secondary pulley pressure (hydraulic pressure) inputted from secondary pulley pressure sensor 13.

Predicted thrust difference calculating section 113 calculates a predicted thrust difference FT* on the basis of primary pulley thrust Fpri, secondary pulley thrust Fsec and balance thrust ratio α and from the following expression (3).

$$FT*=Fsec\times\alpha-Fpri \quad (3)$$

The above-discussed thrust is a biasing force of pressing each pulley in the axial direction, and balance thrust ratio α will be discussed in the explanation of balance thrust ratio calculating section 112.

Stroke speed calculating section 115 calculates a stroke speed dxs/dt by obtaining a time differential of stroke position xs calculated at stroke position calculating section 114.

Correction gain calculating section 116 calculates correction gain k (k=dxs/dxsc) by multiplying stroke speed dxs/dt by the inverse of predicted stroke speed dxsc/dt. Correction gain k represents a rate of actual stroke speed dxs/dt with respect to predicted stroke speed dxsc/dt.

Figure 8:
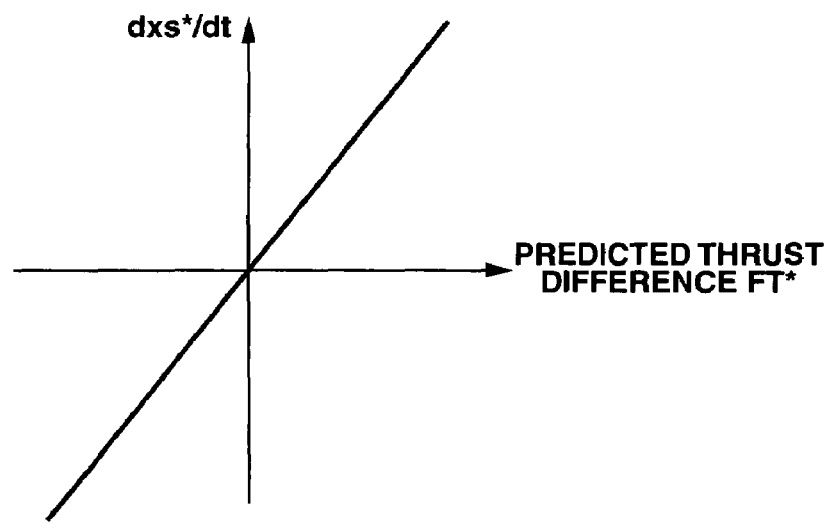
FIG. 8 is a graph showing a predicted stroke speed map employed in the embodiment of the present invention.

Predicted stroke speed calculating section 117 calculates predicted stroke speed dxsc/dt on the basis of the predicted trust difference FT* calculated at predicted trust difference calculating section 113, from a predicted stroke speed map shown in FIG. 8. As a part of second correcting section 300, predicted stroke speed calculating section 117 calculates corrected predicted stroke speed dxsc/dt by multiplying stroke speed dxs/dt by the inverse of correction gain k calculated at correction gain calculating section 116. This predicted stroke speed dxsc/dt corresponds to the integral of predicted thrust difference FT*.

Stroke speed difference calculating section 118 calculates a stroke speed difference Δdxs/dt between target stroke speed dxs*/dt and predicted stroke speed dxsc/dt. Integral section 119 obtains a corrected stroke quantity Δxs by integrating stroke speed difference Δdxs/dt. This corrected stroke quantity Δxs corresponds to a value corrected by first correcting section 400.

In second controlling section 300, transmission ratio calculating section 111 calculates an actual transmission ratio ip on the basis of the primary pulley revolution speed inputted from primary pulley revolution speed sensor 14 and the secondary pulley revolution speed inputted from secondary pulley revolution speed sensor 15.

Figure 7:
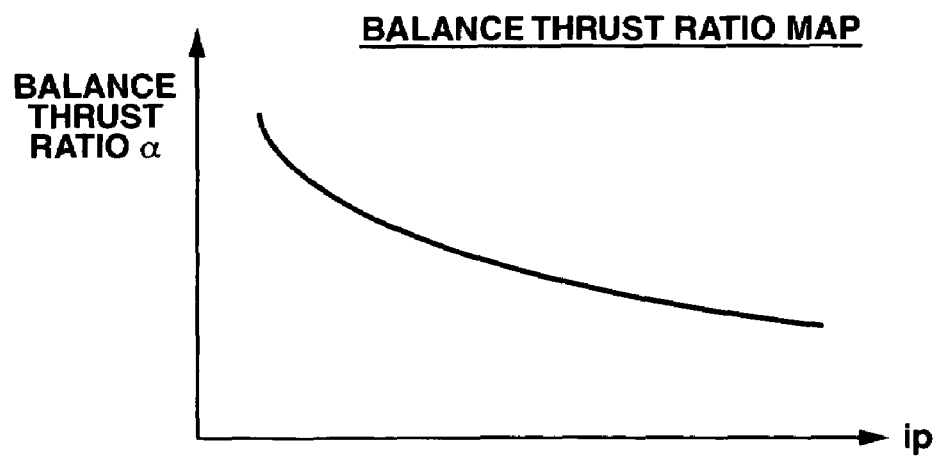
FIG. 7 is a graph showing a balance thrust difference employed in the embodiment of the present invention.

Balance thrust ratio calculating section 112 calculates a thrust ratio, by which trusts of primary pulley 1 and secondary pulley 2 are balanced, on the basis of actual transmission ratio ip using a balance thrust ratio map shown in FIG. 7. More specifically, defining such that the primary pulley balance thrust is Fpri(balance) and the secondary pulley balance thrust is Fsec(balance), a balance thrust ratio α is represented by Fpri(balance)/Fsec(balance). In the embodiment according to the present invention, each pulley thrust, which is capable of maintaining a transmission ratio selected, is defined as a basic thrust force F(α).

Figure 6:
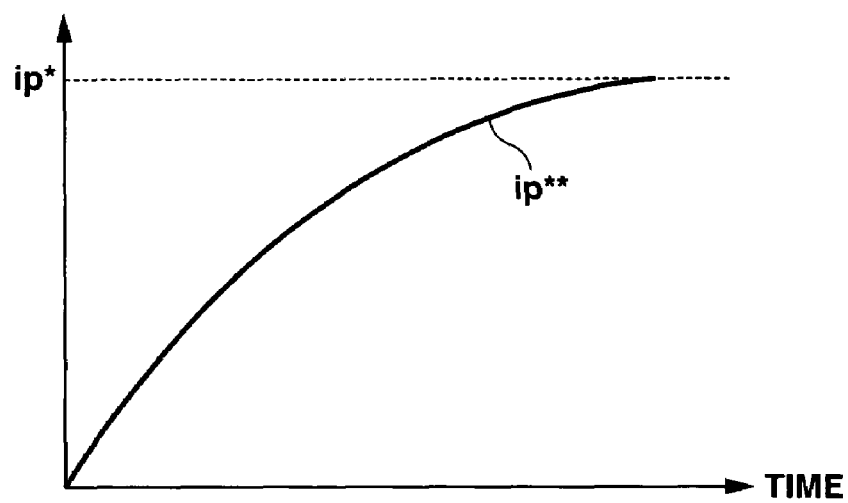
FIG. 6 is a time chart showing a relationship between a first transmission ratio and a second transmission ratio employed in the embodiment of the present invention.
Figure 9:
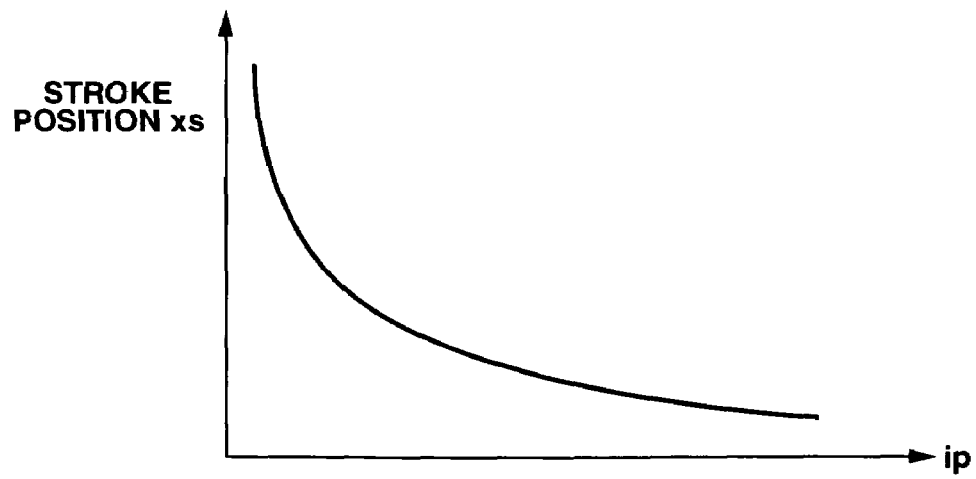
FIG. 9 is a graph showing a stroke speed map employed in the embodiment of the present invention.

Stroke position calculating section 114 calculates stroke position xs at actual transmission ratio ip on the basis of actual transmission ratio ip and from a stroke position map shown in FIG. 9. Second target transmission ratio calculating section 120 calculates a second target transmission ratio ip** from first target transmission ratio ip* and shift time constant TM. This second target transmission ratio ip** is set based on a relationship such as a first-order lag with respect to first target transmission ratio ip* and is a transmission ratio of smoothly executing shifting. More specifically, when first target transmission ratio ip* is varied by step input, second target transmission ratio ip** is set so as to smoothly follow first target transmission ratio ip* as shown in FIG. 6.

Target stroke position calculating section 121 calculates a target stroke position xs on the basis of second target transmission ratio ip from a stroke position map shown in FIG. 9. Adding section 122 obtains a third target stroke position xs* corresponding to a third target transmission ratio ip* by adding corrected stroke quantity Δxs to target stroke position xs. Stroke position difference calculating section 123 calculates a stroke difference Δxs* between an actual stroke position xs and third target stroke position xs*. PI controlling section 124 calculates a necessary trust component FT(stroke) constituted by a proportion component and an integral component of stroke difference Δxs*.

In command value calculating section 700, thrust calculating section 125 calculates a primary thrust Fpri and a secondary thrust Fsec on the basis of thrust difference FT, necessary thrust component FT(stroke), balance thrust ratio α, and an input torque T inputted from a power source such as an engine. Primary pulley hydraulic pressure converting section 126 converts primary thrust Fpri to a primary hydraulic pressure on the basis of a pressure receiving area and the like and obtains a primary pulley hydraulic pressure command value. Secondary pulley hydraulic pressure converting section 127 converts secondary thrust Fsec to a secondary hydraulic pressure on the basis of a pressure receiving area and the like and obtains a secondary pulley hydraulic pressure command value.

Figure 10:
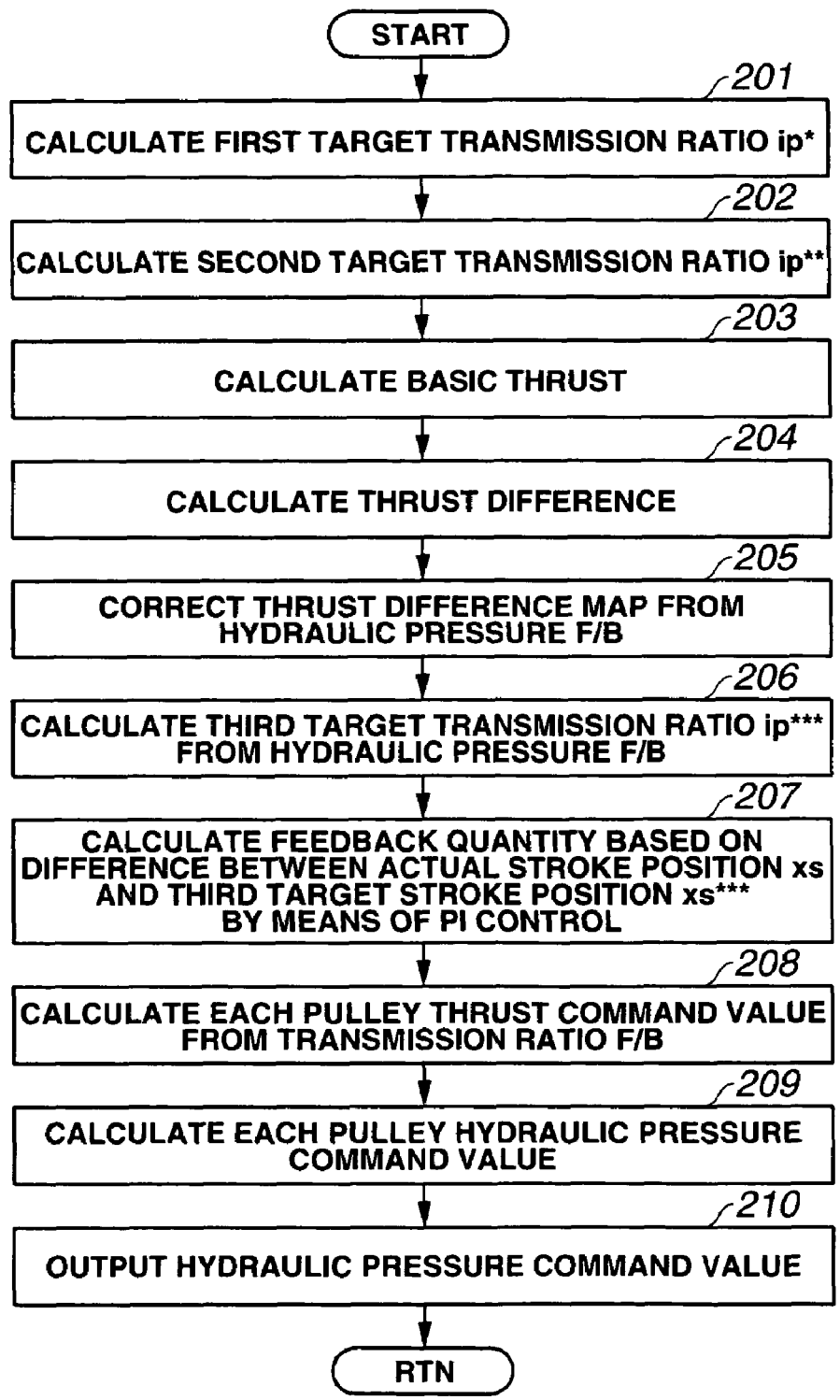
FIG. 10 is a flowchart showing a shift control employed in the embodiment of the present invention.

Subsequently, there is discussed a shift control processing with reference to a flowchart of FIG. 10, which shows a shift control of the belt type CVT according to the embodiment of the present invention.

At step 201, first target transmission ratio ip* is calculated. At step 202, second target transmission ratio ip** is calculated from first target transmission ratio ip* and time constant TM and obtains target stroke position xs corresponding to second target transmission ratio ip (refer to second target transmission ratio calculating section 120 and target stroke position calculating section 121).

At step 203, basic thrust F(α) is calculated on the basis of the calculation result α obtained at balance thrust ratio calculating section 112. At step 204, thrust difference FT is calculated at thrust difference calculating section 108.

At step 205, the thrust difference map of thrust difference calculating section 108 is corrected using correction gain k which is obtained by a hydraulic pressure feedback control. At step 206, third target stroke position xs* corresponding to third target transmission ratio ip* is obtained by the hydraulic pressure feedback (refer to adding section 122).

At step 207, a feedback quantity is obtained on the basis of actual stroke position xs and third target stroke position xs*** using PI control. At step 208, the final necessary thrust is obtained from basic thrust F(α), thrust difference FT and necessary thrust component FT(stroke).

At step 209, each pulley hydraulic pressure command value is obtained from each pulley thrust command value obtained at step 208. At step 210, each pulley hydraulic pressure command value obtained at step 208 is outputted. Steps 201 through 210 are repeatedly executed.

Subsequently, there is discussed the control operation during shifting according to the embodiment of the present invention.

First controlling section 200 calculates first target transmission ratio ip* on the basis of the throttle opening and the vehicle speed. Target shift speed dip/dt is then calculated on the basis of the difference between first target transmission ratio ip* and actual transmission ratio ip, and the thrust difference is calculated on the basis of target shift speed dip/dt (refer to thrust difference calculating section 108).

On the other hand, second controlling section 300 calculates balance thrust ratio α corresponding to present actual transmission ratio ip, and then calculates the difference between first target transmission ratio ip* inputted by the step input and second target transmission ratio ip** set by the first-order delay relative to first target transmission ratio ip*. Further second controlling section 300 calculates the thrust difference corresponding to this difference (refer to PI control section 124).

Figure 11:
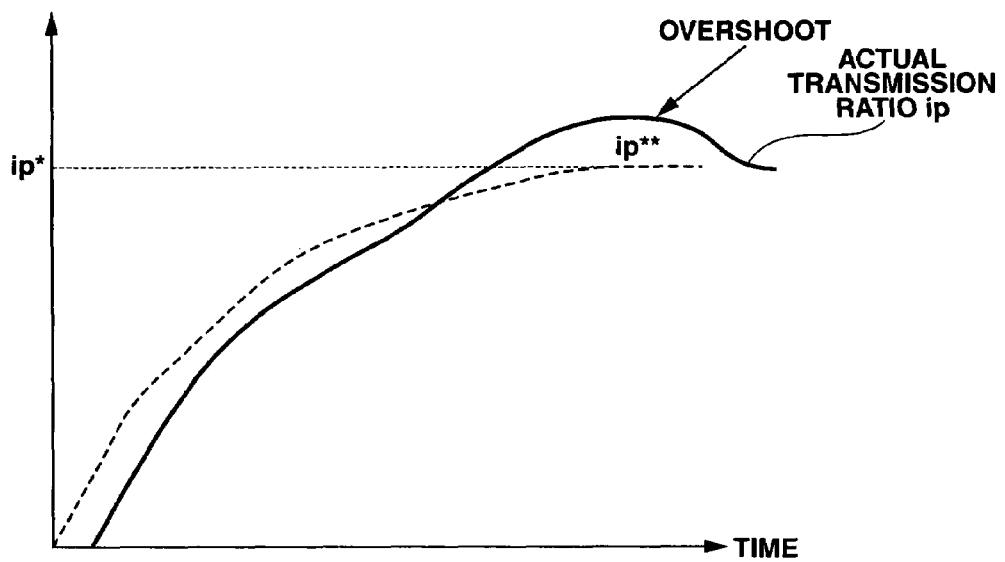
FIG. 11 is a time chart showing a change of an actual transmission ratio in case that shifting is executed using only first and second controlling sections.

Herein, as a conventional control, there is discussed a case that a shift control is executed only by first controlling section 200 and second controlling section 300, with reference to a time chart shown in FIG. 11.

First target transmission ratio ip* is set according to an intent of a driver. Each pulley thrust is calculated so as to achieve this first target transmission ratio ip*, and therefore the actual transmission is executed. Since the target value is set according to the driver's intent and the actual shifting starts in response to the generation of each pulley hydraulic pressure, actual transmission ratio ip is hard to reach the target value as far as each pulley hydraulic pressure does not reach a sufficient value. Accordingly, under this condition, a value based on this difference between the actual transmission ratio and the target transmission ratio is accumulated in an integral component of PI controller 124. Due to the accumulation of the integral component, the controlled variable is further increased even when the actual transmission ratio ip reaches the target value. This causes an overshoot of the actual transmission ratio ip with respect to first target transmission ratio ip* and makes a difficulty in a stable shift control.

Figure 12:
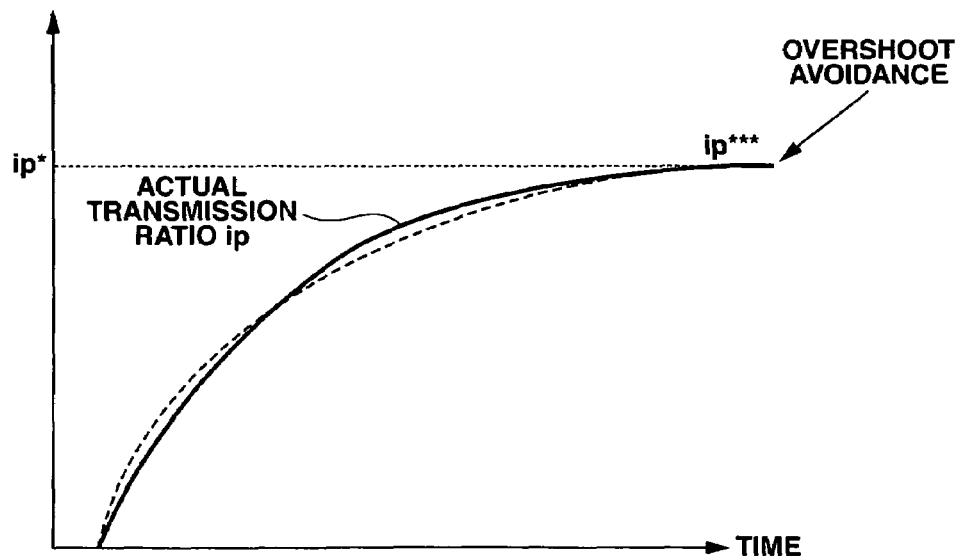
FIG. 12 is a time chart showing a change of the actual transmission ratio in case that shifting is executed using the shift control according to the embodiment of the present invention.

In contrast to this conventional control, the embodiment according to the present invention is arranged to comprise first correcting section 400 of correcting the target transmission ratio on the basis of the actual hydraulic pressure and to prevent the overshoot of the shift control thereby. The first correcting section 400 detects the actual hydraulic pressure and calculates the predicted thrust difference and the predicted stroke speed on the basis of the pulley hydraulic pressures. Since the stroke speed of each pulley is a phenomenon generated after the pulley hydraulic pressure is generated, it is possible to accurately predict the stroke speed of each pulley. Accordingly, third target transmission ratio ip* is set by correcting second target transmission ratio ip on the basis of the difference between predicted stroke speed dxsc/dt and target stroke speed dx*/dt. More specifically, by correcting second target transmission ratio ip on the basis of the generating condition of the actual hydraulic pressure, it becomes possible to prevent the difference between actual transmission ratio ip and target transmission ratio (third target transmission ratio ip*) from becoming large. This prevents the accumulation of the integral component. Accordingly, it becomes possible to achieve the stable shift control by suppressing the overshoot. FIG. 12 is a time chart in case that the shift control according to the embodiment of the present invention is executed. As is apparent from FIG. 12, the overshoot is suppressed and thereby ensuring the high trackability of the actual transmission ratio with respect to the target transmission ratio.

In case that predicted stoke speed dxsc/dt is calculated from the actual hydraulic pressure, the predicted stroke speed map shown in FIG. 8 is used in the calculations. Since there is a tendency that the map causes a deviation due to variations among products, operation condition such as oil temperature and aging, correction gain calculating section 116 is arranged to calculate a rate of actual stroke speed dxs/dt with respect to predicted stroke speed dxsc/dt and to correct the predicted stroke speed map using this rate as shown in second correcting section 500. The thrust difference map shown in FIG. 5 is also corrected using the correction gain k as shown in third correcting section 600. This arrangement further improves the control accuracy.

Hereinafter, there are discussed advantages of the embodiment according to the present invention.

(1) The shift control apparatus of the belt type continuously variable transmission, which controls a transmission ratio using first controlling section 200 and second controlling section 300, is arranged to detect the primary pulley hydraulic pressure and the secondary pulley hydraulic pressure and to comprise first correcting section 200 for correcting second target transmission ratio ip on the basis of the detected hydraulic pressures. Therefore, by correcting second target transmission ratio ip on the basis of the actual hydraulic pressures, it becomes possible to prevent the accumulation of the integral component. This prevents the overshoot of the actual transmission ratio during the shift control and achieves the stable shift control.

(2) Since second target transmission ratio ip** is corrected on the basis of the difference between the predicted stroke speed dxsc/dt predicted based on the actual hydraulic pressure and the target stroke sped dsx*/dt, it becomes possible to execute the correction at a phase which is earlier than a phase of actually generating the stroke speed in control, and therefore the control is improved in accuracy.

(3) Since second correcting section 500 corrects the predicted stroke speed on the basis of the actual stroke speed, it becomes possible to predicted the stoke speed according to a condition of the actual stroke speed, and therefore the control accuracy is improved thereby.

(4) Since third correcting section 600 corrects the target stroke speed on the basis of the actual stroke speed and the predicted stroke speed, it becomes possible to correct the target stroke speed (or thrust difference FT') according to the condition of the actual stroke speed, and therefore the control accuracy is improved thereby.

This application is based on a prior Japanese Patent Application No. 2005-113808. The entire contents of the Japanese Patent Application No. 2005-113808 with a filing date of Apr. 11, 2005 are hereby incorporated by reference. The scope of the invention is defined with reference to the following claims.

Although the invention has been described above by reference to a certain embodiment of the invention, the invention is not limited to the embodiment described above. Modifications and variations of the embodiment described above will occur to those skilled in the art, in light of the above teaching. The scope of the invention is defined with reference to the following claims.

What is claimed is:

1. A shift control apparatus of a belt type continuously variable transmission comprising:
   a first controlling section setting a first hydraulic pressure controlled variable on the basis of a first target transmission ratio, which is determined based on a vehicle traveling condition;
   a second controlling section setting a second hydraulic pressure controlled variable on the basis of a second target transmission ratio, which is determined based on a predetermined transfer characteristic;
   a transmission ratio controlling section steplessly controlling a transmission ratio by controlling a primary pulley hydraulic pressure and a secondary pulley hydraulic pressure on the basis of the first hydraulic pressure controlled variable and the second hydraulic pressure controlled variable;
   a hydraulic pressure detecting section detecting at least one of a primary pulley hydraulic pressure and a secondary pulley hydraulic pressure; and
   a first correcting section correcting the second target transmission ratio on the basis of the hydraulic pressure detected by the hydraulic pressure detecting section.

2. The shift control apparatus as claimed in claim 1, wherein the second controlling section sets the second hydraulic pressure controlled variable when an actual transmission ratio is changed to the first target transmission ratio.

3. The shift control apparatus as claimed in claim 1, further comprising a predicted stroke speed calculating section which calculates a predicted stroke speed on the basis of the hydraulic pressure detected by the hydraulic pressure detecting section,
   wherein the first controlling section sets the first hydraulic pressure controlled variable on the basis of a target stroke speed of at least one of the primary pulley and the secondary pulley, and the first correcting section corrects the second target transmission ratio on the basis of a difference between the target stroke speed and the predicted stroke speed.

4. The shift control apparatus as claimed in claim 3, further comprising an actual stroke speed detecting section which detects an actual stroke speed of at least one of the primary pulley and the secondary pulley, and a second correcting section which corrects the predicted stroke speed on the basis of the actual stroke speed.

5. The shift control apparatus as claimed in claim 4, further comprising a third correcting section which corrects the target stroke speed employed in the first controlling section on the basis of the actual stroke speed and the predicted stroke speed.

6. A method of executing a shift control of a belt type continuously variable transmission, the method comprising the steps of:
   setting a first hydraulic pressure controlled variable on the basis of a first target transmission ratio, which is determined based on a vehicle traveling condition;
   setting a second hydraulic pressure controlled variable on the basis of a second target transmission ratio, which is determined based on a predetermined transfer characteristic;
   steplessly controlling the transmission ratio by controlling a primary pulley hydraulic pressure and a secondary pulley hydraulic pressure on the basis of the first hydraulic pressure controlled variable and the second hydraulic pressure controlled variable;
   detecting at least one of a primary pulley hydraulic pressure and a secondary pulley hydraulic pressure; and
   correcting the second target transmission ratio on the basis of the hydraulic pressure detected by a hydraulic pressure detecting section.

7. A shift control apparatus of a belt type continuously variable transmission which is mounted on a vehicle and has hydraulically controlled primary and secondary pulleys, the shift control apparatus comprising:
   a controller arranged
   to calculate a first target transmission ratio on the basis of a vehicle traveling condition,
   to calculate a first hydraulic pressure controlled variable on the basis of the first target transmission ratio,
   to calculate a second target transmission ratio on the basis of the first target transmission ratio and a predetermined transfer characteristic,
   to calculate a second hydraulic pressure controlled variable on the basis of the second target transmission ratio,
   to obtain at least one of actual hydraulic pressures of the primary and secondary pulleys,
   to correct the second target transmission ratio on the basis of the obtained hydraulic pressure, and
   to calculate a command value for controlling hydraulic pressures of the primary and secondary pulleys on the basis of the first and second hydraulic pressure controlled variables, and
   to output the command value to an actuator for hydraulically controlling the primary and secondary pulleys.

8. A shift control apparatus of a belt type continuously variable transmission comprising:
   first controlling means for setting a first hydraulic pressure controlled variable on the basis of a first target transmission ratio, which is determined based on a vehicle traveling condition;
   second controlling means for setting a second hydraulic pressure controlled variable on the basis of a second target transmission ratio, which is determined based on a predetermined transfer characteristic, when an actual transmission ratio is changed to the first target transmission ratio;
   transmission ratio controlling means for steplessly controlling the transmission ratio by controlling a primary pulley hydraulic pressure and a secondary pulley hydraulic pressure on the basis of the first hydraulic pressure controlled variable and the second hydraulic pressure controlled variable;
   hydraulic pressure detecting means for detecting at least one of a primary pulley hydraulic pressure and a secondary pulley hydraulic pressure; and
   first correcting means for correcting the second target transmission ratio on the basis of the hydraulic pressure detected by the hydraulic pressure detecting means.

* * * * *